(No Model.)
R. T. PETTEBONE.
SHOVEL OR SCOOP.
No. 413,262.        Patented Oct. 22, 1889.
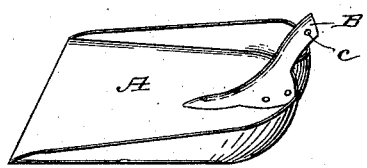
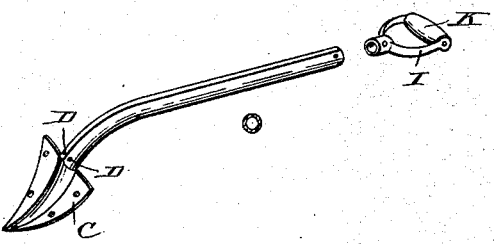
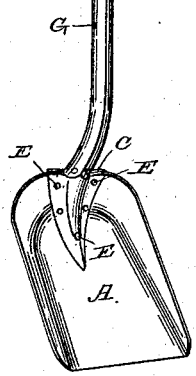
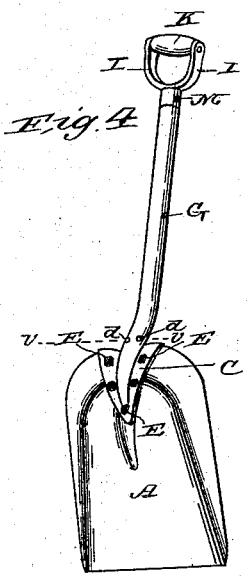
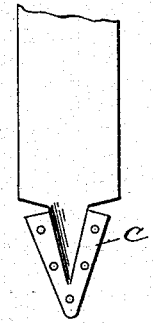
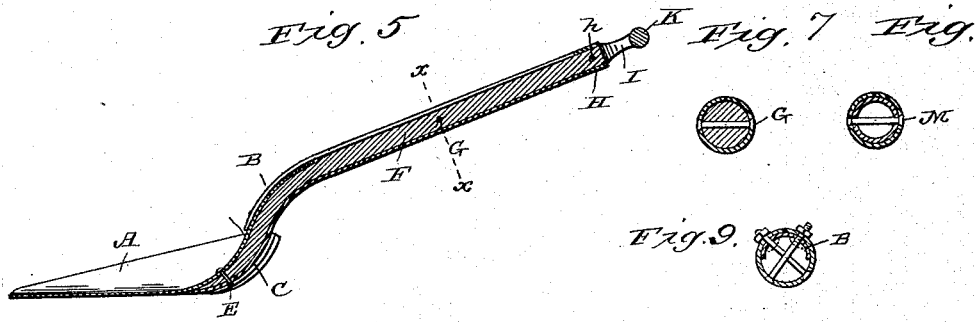
Witnesses
E. D. Smith
Alex. F. Stewart
Inventor
Robert T. Pettebone
By his Attorneys
Church & Church

UNITED STATES PATENT OFFICE.

ROBERT T. PETTEBONE, OF WYOMING, PENNSYLVANIA.

SHOVEL OR SCOOP.

SPECIFICATION forming part of Letters Patent No. 413,262, dated October 22, 1889.

Application filed June 5, 1889. Serial No. 313,126. (No model.)

*To all whom it may concern:*

Be it known that I, ROBERT T. PETTEBONE, of Wyoming, in the county of Luzerne and State of Pennsylvania, have invented certain new and useful Improvements in Shovels or Scoops; and I do hereby declare the following to be a full, clear, and exact description of the same, reference being had to the accompanying drawings, forming a part of this specification, and to the figures and letters of reference marked thereon.

Shovels or scoops of the class to which my present invention relates have heretofore been constructed with a blade having a depression in the back thereof for the reception of the end of the handle, and the end of the back strap forming one side of the socket for the handle, a front strap being secured to the front of the blade, forming the other side of the socket for said handle. Thus the back strap and rivets were fully protected from wear, &c., as fully set forth and described, for instance, in my prior patents, No. 282,363, dated July 31, 1883, and No. 257,752, dated May 9, 1882.

While shovels and scoops constructed as above described possess many advantages, it is found in the practical use of such articles that the blade or body portion proper will become worn out or destroyed long before the handle and socket or straps, thus, as such parts are permanently attached thereto, necessitating the discarding or throwing away of the entire shovel.
My present invention has for its object to overcome this difficulty, and at the same time to provide a cheap and desirable shovel having an indestructible handle adapted to be readily applied or removed from scoop or shovel blades of a certain definite kind by an unskilled workman; to which ends the invention consists, primarily, in a shovel having a removable handle, with a long back strap lying in a depression, as before mentioned, whereby the bolts or other attaching media are protected from wear and destruction.

The invention, secondly, consists in a back strap of the character described formed into a long tubular handle or sheath and attached to the front strap on the upper side near the blade, whereby the handle and the blade are securely united and braced; and, finally, the invention consists in certain novel details of construction and combinations and arrangements of parts, as will be hereinafter described, and pointed out particularly in the claims at the end of this specification.

In the accompanying drawings, Figure 1 is a perspective view of a scoop-blade constructed in accordance with the present invention and ready to have the handle applied thereto. Fig. 2 is a perspective view of the handle or sheath portion ready for application to the blade, with the grip or D-handle separated therefrom. Fig. 3 is a perspective view of the parts assembled, looking at the front; and Fig. 4 is a similar view, looking at the rear side of the shovel. Fig. 5 is a longitudinal section showing a handle in which the back strap forms a sheath for a wooden center. Fig. 6 is a view of a blank from which the back strap and handle are formed. Fig. 7 is a section on the line $x\,x$, Fig. 3; and Fig. 8 is a section on the line $y\,y$, Fig. 3. Fig. 9 is a view on the line $v\,v$, Fig. 4.

Similar letters of reference in the several figures indicate the same parts.

Referring particularly to Fig. 1, it will be seen that the blade A is constructed in all respects similar to that described in my before-mentioned patents, save that the front strap B, instead of extending up and surrounding the handle above the blade, is very short, and is provided with means for attachment to the handle, or forwardly-extending portion of the back strap forming the same, as will be presently described, preferably consisting in simple holes or perforations $c$, through which bolts are passed to accomplish the desired end. The back strap C is formed at the lower end, or at the point of attachment to the blade, similarly to that described in my said patent; but instead of the upper end being narrow it is widened, as shown in Fig. 6, and elongated to extend up to the grip or D-handle, the whole then being swaged up into tubular form, and constitutes, when of thick material, the handle itself, and when of thin material a casing or sheath for a wooden core, which latter gives the necessary strength and elasticity thereto. The handle thus formed has the edges of the blank brought together on the upper side, giving greater strength, and leaving the under side smooth, whereby the hands are protected against injury by having the flesh forced into the crack in lifting heavy loads.

At the lower end the corners of the blank forming the tubular portion are provided with apertures D, corresponding to those in the front strap of the blade, and said tubular portion is also preferably provided with apertures $d$ at the back diametrically opposite those at the front.

In order, now, to assemble or unite the back strap and handle and the blade, it is only necessary to bring them together in the position illustrated in Figs. 2 and 4, and pass small bolts E through the blade and back strap at the points indicated, and then pass bolts through the registering-apertures D $c$ in the tubular portion of the back strap or handle and the front strap immediately above the blade, when it will be found that the parts are as firmly and securely united as would be the case were they assembled in accordance with instructions contained in my prior patents.

It will be seen that the heads of the bolts are placed inside of the blade and the nut and screw-threaded ends on the outside, where they lie entirely within the depression aforesaid, and are thus protected from all wear or danger of being knocked off or mutilated. It will also be seen that the bolts passing through the tubular portion and front strap are high enough to escape any possible wear, but at the same time are so low as to prevent all danger or liability of the operator's hand coming in contact therewith. These last-mentioned bolts, too, it will be seen, preferably extend through the back strap and cross each other, thus forming braces or supports for the tubular portion. As before intimated, the tubular portion may, instead of forming the entire handle, simply constitute a sheath for a wooden core or handle F, (see Fig. 5,) in which case the tubular portion extends clear up to the base of the grip or D-handle, the latter being formed in one with the wooden portion, in the usual manner, or, preferably, as shown in said figure, in which it will seen that the D-handle is formed of malleable iron, with a socket or thimble portion H, for the reception of the end of the wooden core, to which it is united by a suitable rivet $h$ or otherwise, and with upwardly-extending arms I, between the ends of which the handle proper K is held. When, however, the tubular portion itself constitutes the handle, it is preferably provided with cross-bolts, such as G, at one or more points intermediate the ends, to draw the edges tightly together and for the sake of additional strength, and in this instance the D-handle, instead of having a socketed end for the reception of the wooden core, is made of such size as to fit within the tubular strap, and is united thereto, preferably by a cross-rivet M.

From the above description it will be seen that I have produced a shovel having an adjustable or detachable handle which may be easily and readily applied to any blade having the characteristics mentioned, and which, when so united, will be strong and durable, not liable to be bent or broken, and the initial cost of which is, if anything, much less than a shovel having a wooden handle possessing the same strength, but which could not possibly have half the endurance or wearing qualities. Further than this, it will be seen that by the invention herein set forth a person using a large number of shovels or scoops is enabled to effect a very material saving in the cost of the same, as when a blade wears out it is only necessary to remove the same and supply a new one, a large number of which may be constantly kept on hand and procured at a comparatively small cost.

While I have particularly described the tubular portion as extending up to the handle, it is obvious that the same may be shorter and constitute a socket for the end only of the wooden core or handle, and, further, that many of the details of the structure may be changed without departing from the spirit of my invention. For instance, instead of the bolts, ordinary rivets may be employed to unite the blade and handle, and when it is desired to renew the blade the heads of the bolts may be broken off by means of a chisel, or in any preferred manner.

Having thus described my invention, what I claim as new is—

1. The combination, with the blade of a shovel or scoop having the depression therein, of the back strap having the extended lower end removably secured within the said depression and formed into the tubular handle at the upper end, substantially as described.

2. The combination, with the blade of a shovel or scoop, of the back strap having the extended flanged lower end secured to the blade on the outside, the tubular-handle portion, and the front strap on the blade secured to the lower end of the tubular-handle portion, substantially as described.

3. The combination, with the blade of a shovel or scoop having the depression in the rear portion, of the back strap having the extended flanged lower end removably secured within said depression and having the tubular-handle portion integral therewith, and the front strap on the blade removably secured to the lower end of the tubular-handle portion, as set forth.

4. As an improved article of manufacture, a shovel-handle formed of sheet-metal, having the edges brought together on the upper side, with the flanged lower end on the under side, substantially as described.

5. The combination, with the blade having the front strap thereon, of the back strap having the extended lower end, the sheet-metal tubular handle integral therewith, having the edges brought together on the upper side, the bolts uniting the lower corners of the tubular portion and front strap, and the bolts uniting the back strap and blade, substantially as described.

6. The combination, with the tubular handle formed of sheet metal and the blade and front strap, of the crossed bolts passing through the handle and uniting the same and front strap, substantially as described.

7. In a shovel, the combination, with the tubular handle or sheath, of the wooden core and the separate malleable-iron grip or handle secured thereon, and against which the upper end of the tubular portion abuts, substantially as described.

ROBERT T. PETTEBONE.

Witnesses:
 J. FRANK NUSS,
 R. E. HUTCHINS.